US008379919B2

(12) United States Patent
Bronder et al.

(10) Patent No.: US 8,379,919 B2
(45) Date of Patent: Feb. 19, 2013

(54) MULTIPLE CENTROID CONDENSATION OF PROBABILITY DISTRIBUTION CLOUDS

(75) Inventors: Matthew Bronder, Bellevue, WA (US); Oliver Williams, San Francisco, CA (US); Ryan Geiss, San Jose, CA (US); Andrew Fitzgibbon, Cambridge (GB); Jamie Shotton, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 12/770,394

(22) Filed: Apr. 29, 2010

(65) Prior Publication Data

US 2011/0268316 A1    Nov. 3, 2011

(51) Int. Cl.
*G06K 9/00* (2006.01)
(52) U.S. Cl. .......... 382/103; 382/106; 382/154; 382/225
(58) Field of Classification Search .................. None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Shotton et al. (Jun. 2011) "Real-time human pose recognition in parts from single-depth images." Proc. 2011 IEEE Conf. on Computer Vision and Pattern Recognition, pp. 1297-1304.*

(Continued)

*Primary Examiner* — Barry Drennan
(74) *Attorney, Agent, or Firm* — Vierra Magen Marcus & DeNiro LLP

(57) ABSTRACT

Systems and methods are disclosed for identifying objects captured by a depth camera by condensing classified image data into centroids of probability that captured objects are correctly identified entities. Output exemplars are processed to detect spatially localized clusters of non-zero probability pixels. For each cluster, a centroid is generated, generally resulting in multiple centroids for each differentiated object. Each centroid may be assigned a confidence value, indicating the likelihood that it corresponds to a true object, based on the size and shape of the cluster, as well as the probabilities of its constituent pixels.

20 Claims, 9 Drawing Sheets

U.S. PATENT DOCUMENTS

| | | | |
|---|---|---|---|
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,229,918 B1 * | 5/2001 | Toyama | 382/173 |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,941,321 B2 | 9/2005 | Schuetze et al. | |
| 6,950,534 B2 | 9/2005 | Cohen et al. | |
| 7,003,134 B1 | 2/2006 | Covell et al. | |
| 7,035,431 B2 * | 4/2006 | Blake et al. | 382/103 |
| 7,036,094 B1 | 4/2006 | Cohen et al. | |
| 7,038,855 B2 | 5/2006 | French et al. | |
| 7,039,239 B2 * | 5/2006 | Loui et al. | 382/225 |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,158,680 B2 * | 1/2007 | Pace | 382/232 |
| 7,167,578 B2 | 1/2007 | Blake et al. | |
| 7,170,492 B2 | 1/2007 | Bell | |
| 7,184,048 B2 | 2/2007 | Hunter | |
| 7,202,898 B1 | 4/2007 | Braun et al. | |
| 7,212,665 B2 | 5/2007 | Yang et al | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,324,671 B2 | 1/2008 | Li et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |

| | | | |
|---|---|---|---|
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,270,733 | B2 * | 9/2012 | Cobb et al. .................... 382/224 |
| 2008/0026838 | A1 | 1/2008 | Dunstan et al. |
| 2008/0152191 | A1 | 6/2008 | Fujimura et al. |
| 2009/0141933 | A1 | 6/2009 | Wagg |
| 2009/0221368 | A1 | 9/2009 | Yen et al. |
| 2010/0197390 | A1 * | 8/2010 | Craig et al. .................... 463/30 |
| 2010/0303289 | A1 * | 12/2010 | Polzin et al. .................. 382/103 |
| 2011/0210915 | A1 * | 9/2011 | Shotton et al. ................ 345/157 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009059065 | 5/2009 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Lefebvre, "Appearance-Space Texture Synthesis", International Conference on Computer Graphics and Interactive Techniques, ACM SIGGRAPH 2006 Papers, Jul. 30-Aug. 3, 2006, pp. 541-548, ACM, New York, NY, USA.

Jia, "Finding Image Exemplars Using Fast Sparse Affinity Propagation", International Multimedia Conference, pp. 639-342, Oct. 26-31, 2008, ACM, New York, NY, USA.

Elhabian, "Moving Object Detection in Spatial Domain using Background Removal Techniques—State-of-Art", Recent Patents on Computer Science 2008, pp. 32-54, vol. 1, revised Sep. 15, 2007, Bentham Science Publishers Ltd.

Criminisi, "Region Filling and Object Removal by Exemplar-Based Image Inpainting", IEEE Transactions on Image Processing, Sep. 2004, pp. 1200-1212, vol. 13, No. 9.

Berendsen, "Tracking and 3D Body Model Fitting Using Multiple Cameras", Multimedia and Geometry group, Department of Information and Computing Sciences, Jul. 31, 2008, 76 pages, Utrecht University, The Netherlands.

* cited by examiner (Step 472)

(Step 476)

*(Step 520)*

MULTIPLE CENTROID CONDENSATION OF PROBABILITY DISTRIBUTION CLOUDS

BACKGROUND

Computer games and multimedia applications have begun employing cameras and software gesture recognition engines to provide a human computer interface ("HCI"). With HCI, user body parts and movements are detected, interpreted and used to control game characters or other aspects of an application. One difficulty in HCI systems is identifying body parts. Exemplar classification is one method in which every pixel is assigned a probability distribution over body parts. Taking one body part at a time, a new, monochrome image is derived in which a pixel is assigned a probability as the likelihood it belongs to the given part. There are many pixels, however, and it benefits performance if the classification results are thinned to a set of prototypical locations, which are referred to herein as centroids.

For performance, it would be ideal if a single centroid were produced for each body part, but this is unlikely. Exemplar, which classifies a pixel based on local features, can yield multiple, disjoint regions of high probability. At most, only one of these will correspond to the true body part. Calculating a global centroid will average pixels relating to the proper body part with those from misclassified regions. This is unreliable as a summary of the exemplar output because it will fall at the center of these multiple regions with no guarantee that it will itself be a meaningful point.

A method is therefore needed to compute zero or more meaningful centroids for a body part, where each centroid is coincident with a region of non-zero probability in the exemplar output.

SUMMARY

Disclosed herein are systems and methods for identifying objects captured by a depth camera by condensing classified image data into centroids of probability that a captured object is a correctly identified body part. Image data captured by a depth camera is processed to produce exemplar output in which each pixel in the depth image is assigned a probability distribution over the body's parts to which it could correspond. The present technology takes this output, and processes it to detect spatially localized clusters of non-zero probability pixels. For each cluster, a centroid is generated, generally resulting in multiple centroids for each body part. Each centroid may be assigned a confidence value, indicating the likelihood that it corresponds to the true body part, based on the size and shape of the cluster, as well as the probabilities of its constituent pixels. The present technology has different embodiments for being implemented, for example by highly parallel execution (e.g., on a graphics processing unit), and embodiments suitable for a system with limited memory bandwidth.

In embodiments, the present technology relates to a method of identifying an object captured by a depth camera by the steps of: a) determining depth information for a group of samples captured by the capture device; b) assigning probabilities to the group of samples captured by the capture device, the assigned probabilities relating to the probability that the samples belong to the real world object; and c) clustering one or more subgroups of the samples together to form one or more candidate centroids for the real world object, the clustering of one or more subgroups in said step c) depending on a proximity between samples, the spatial areas represented by the samples, and a probability that the samples represent the real world object.

In a further embodiment, the present technology relates to a method of identifying body parts captured by a capture device by the steps of: a) determining depth information for a group of pixels captured by the capture device; b) receiving exemplar classification results assigning probabilities that a group of captured pixels belong to a particular body part; c) assigning a confidence score to candidates, the candidates being pixels in the group of captured pixels or centroids formed from pixels in the group of captured pixels, the confidence score based in part on the exemplar classification in said step b); and iteratively evaluating arrays of candidates for merging together to form a next level of candidates based on the candidates' proximity to each other in space, the spatial areas represented by the candidates, and their confidence score determined in said step c).

In further embodiments, the present technology relates to a method of identifying body parts captured by a capture device by the steps of: determining depth patches by segmenting the depth image into regions of approximately constant depth; assigning to each patch a list of patches adjacent to it to define a neighborhood graph; processing exemplars by computing an average probability score assigned by the exemplar process to pixels in the patch; identifying seed clusters as the set of patches that have a higher score than all of their neighbors; and growing clusters outward from the seed patches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Embodiments of the present technology will now be described with reference to FIGS. 1-9, which in general relate to a method of identifying objects captured by a depth camera by condensing classified image data into centroids of probability that a captured object is correctly identified. Such a system may for example be used for identifying captured image objects in a human-computer interface used in gaming or other applications.

Figure 1:
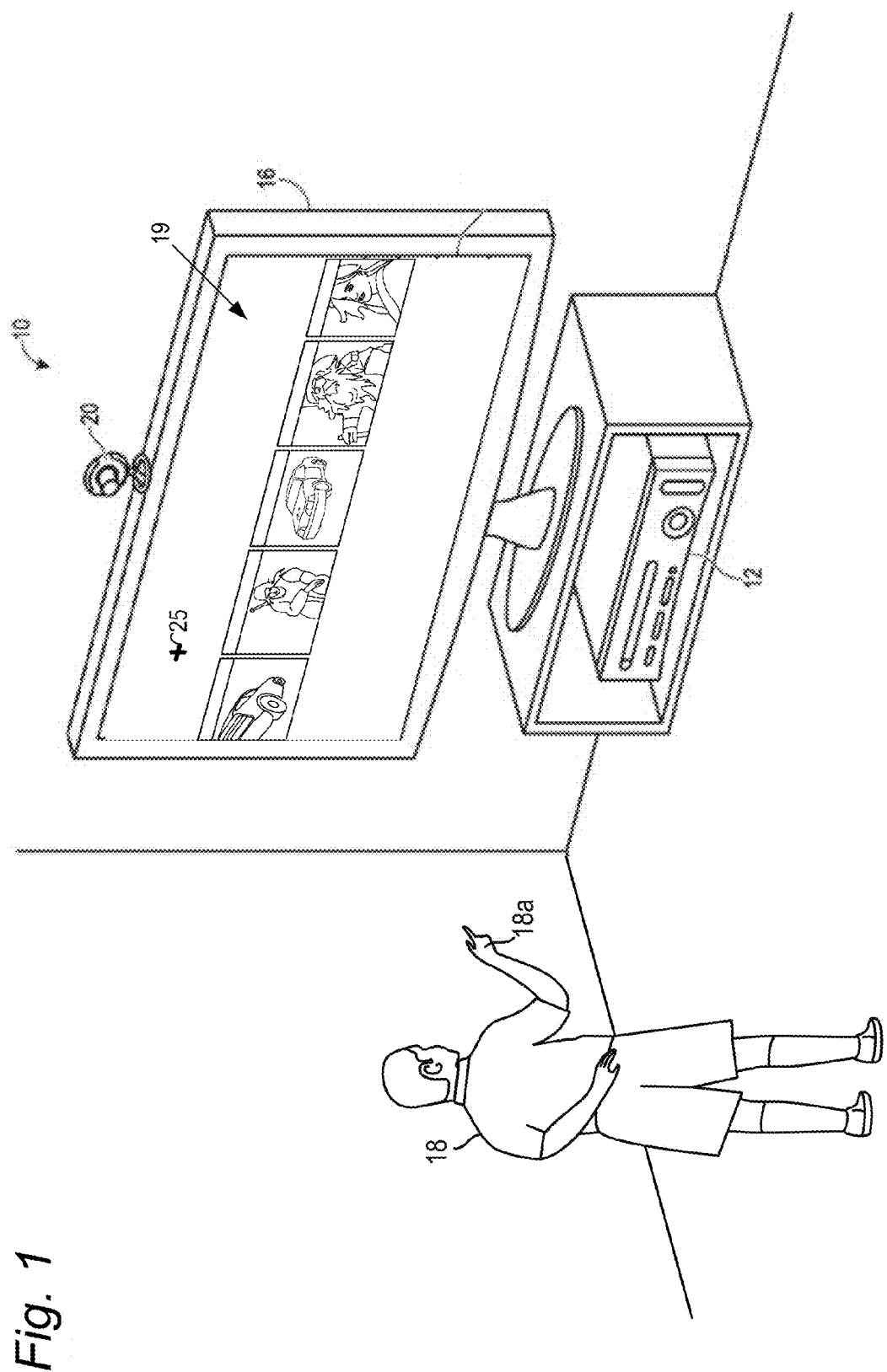
FIG. 1 illustrates an example embodiment of a target recognition, analysis, and tracking system with a user playing a game.
Figure 2:
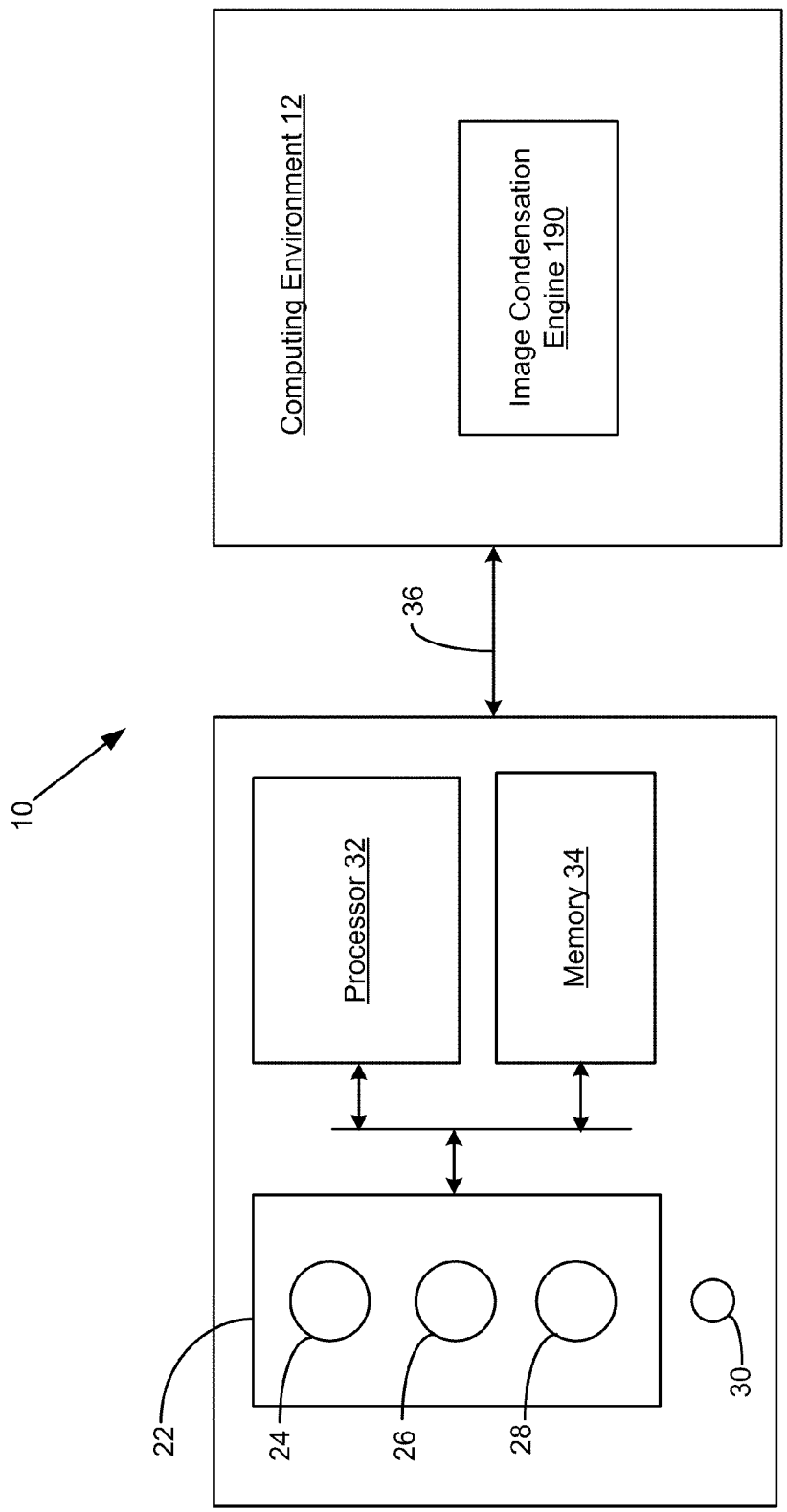
FIG. 2 illustrates an example embodiment of a capture device that may be used in a target recognition, analysis, and tracking system.

Referring initially to FIGS. 1-2, the hardware for implementing the present technology includes a target recognition, analysis, and tracking system 10 which may be used to recognize, analyze, track and identify portions of a human target such as the user 18. Embodiments of the system 10 include a computing environment 12 for executing a gaming or other application, and an audiovisual device 16 for providing audio and visual representations from the gaming or other application. The audiovisual device 16 may be useful in a gaming application, but it is understood that the present technology does not require an audiovisual device for its operation. The system 10 further includes a capture device 20 for capturing positions and movements performed by the user 18, which the computing environment 12 receives, interprets and uses to control the gaming or other application. Each of these components is explained in greater detail below.

FIG. 1 is provided as one example where the computing environment 12 is able to identify one or more objects within the field of view of the capture device 20, such as for example a user's hand 18a. In the example of FIG. 1, the application executing on the computing environment 12 may present a user interface (UI) 19 to the user 18. The UI may be part of a gaming or other application, and in embodiments may be a navigation menu for accessing selected areas of the gaming or other application. The user can interact with the interface 19 via a cursor that is controlled via user movements, for example by pointing with his or her hand 18a. By identifying the user's hand, the present technology is able to set that as the cursor controller. Thereafter, the cursor may provide closed-loop feedback as to where specifically on the audiovisual device 16 the user is pointing. As indicated, FIG. 1 is merely an example. The present technology may be used to identify objects captured by a capture device for a wide variety of other applications.

FIG. 2 illustrates an example embodiment of the capture device 20 that may be used to capture objects for identification according to the present technology. The type of capture device used is not critical to the present technology, so long as the device is able to capture depth information for captured images. However, further details relating to one example of a capture device for use with the present technology are set forth in copending patent application Ser. No. 12/475,308, entitled "Device For Identifying And Tracking Multiple Humans Over Time," which application is incorporated herein by reference in its entirety. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera. While the following description refers to pixels, it is appreciated that the present technology may be performed using other points of data in further embodiments.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28. This information may be used to generate a skeletal model using skeletal mapping techniques. Such techniques allow identification of various points on a user's skeleton, such as for example joints of the hands, wrists, elbows, knees, nose, ankles, shoulders, and where the pelvis meets the spine. Other techniques include transforming the image into a body model representation of the person and transforming the image into a mesh model representation of the person. The depth information and images captured by, for example, the 3-D camera 26 and/or the RGB camera 28 may also be used by an image condensing engine 190 to identify particular objects in the image in accordance with the present technology as explained below.

Figure 3A:
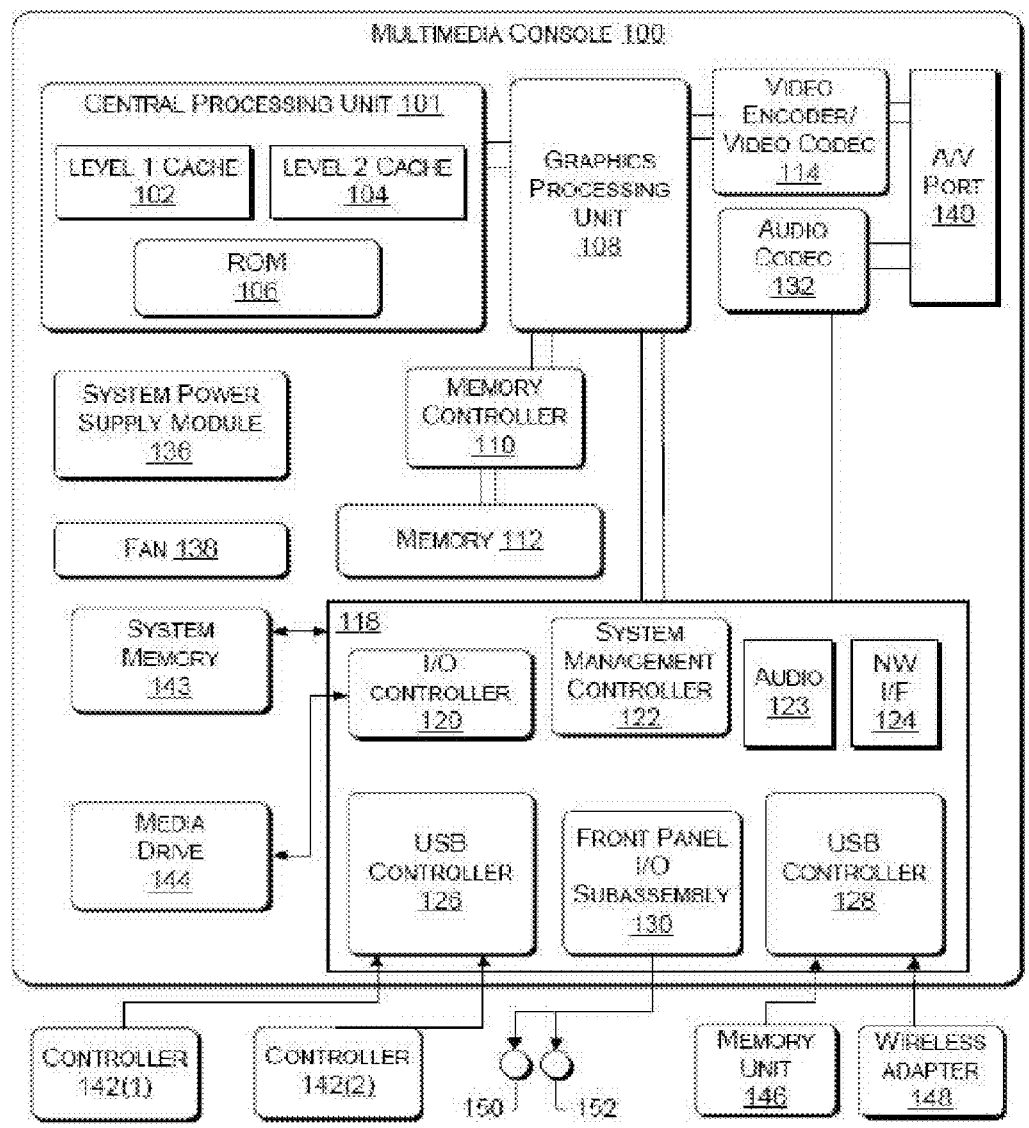
FIG. 3A illustrates an example embodiment of a computing environment that may be used to interpret one or more gestures in a target recognition, analysis, and tracking system.

FIG. 3A illustrates an example embodiment of a computing environment that may be used to interpret one or more user movements in a target recognition, analysis, and tracking system. The computing environment such as the computing environment 12 described above with respect to FIGS. 1-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 3B:
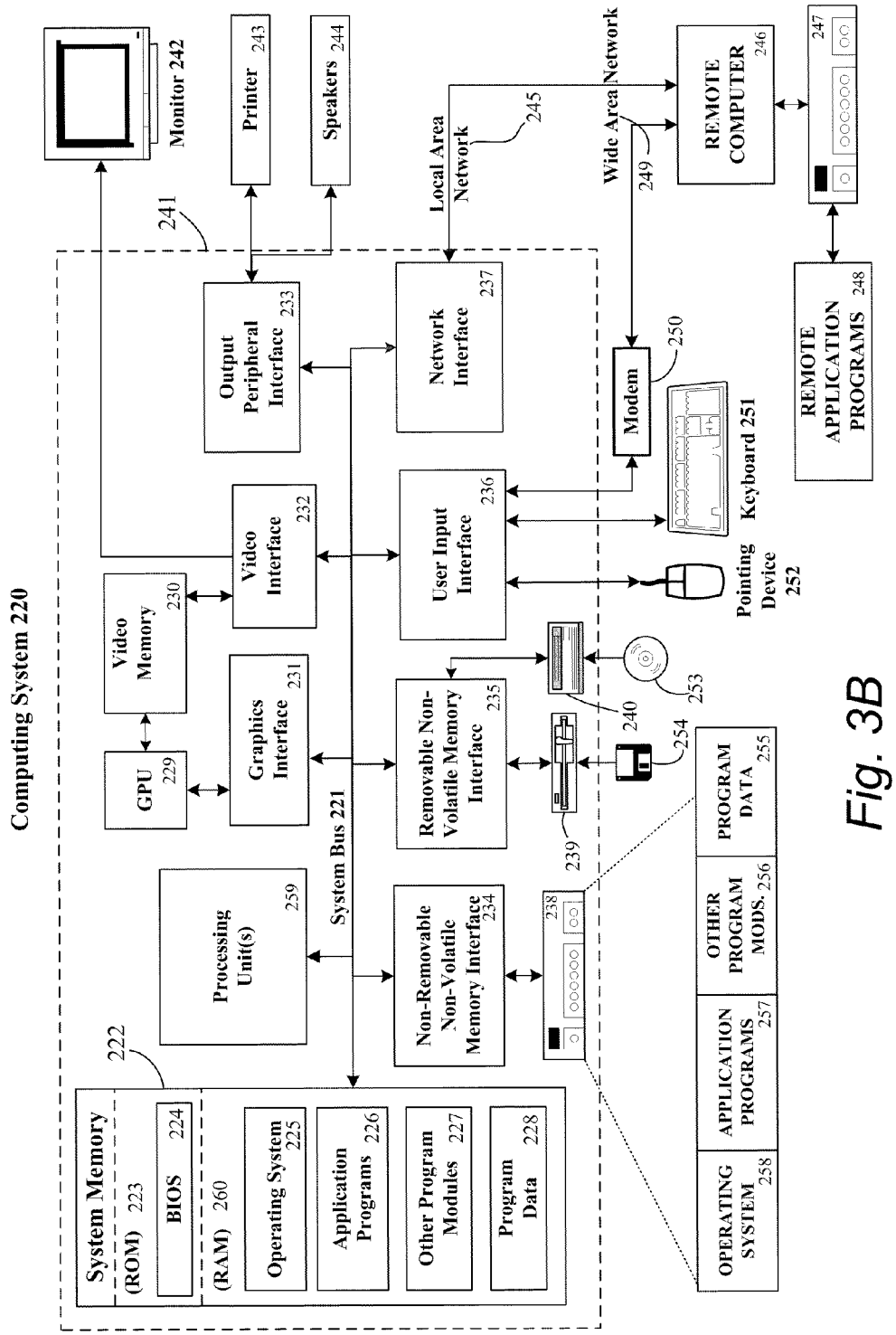
FIG. 3B illustrates another example embodiment of a computing environment that may be used to interpret one or more gestures in a target recognition, analysis, and tracking system.

FIG. 3B illustrates another example embodiment of a computing environment 220 that may be the computing environment 12 shown in FIGS. 1-2 used to interpret one or more user movements in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

The operation of the image condensing engine 190 will now be explained with reference to FIGS. 4 through 9. In general, the image condensing engine 190 condenses image data into groups referred to herein as centroids. The present technology groups individual classification distributions together and merges them into centroids. Centroids may be thought of as positions in 3D space that best capture all the contributing classification samples. Centroids have an associated probability that a captured object is correctly identified as a given object, such as a hand, face, arm, etc.

Once a depth image is received from the depth camera, it is known to perform a process, referred to as an exemplar process, which processes the depth image of a body into an estimate of the body pose. The task of the exemplar process is to classify each pixel by assigning to each pixel a probability distribution over the body's parts to which it could correspond. Thus for example, a given pixel which is in fact from a user's right hand may be assigned a 70% chance it belongs to a right hand, a 20% chance it belongs to a left hand, and a 10% probability distribution over a variety of other body parts.

Subsequent stages of processing are required to convert this probability map into a skeletal estimate. The present technology pertains to a stage of processing following receipt of the exemplar's output. Namely, the present technology transforms the array of classified pixels into candidate locations for body parts. Subsequent processing will use these candidates to assist in estimating a global skeletal configuration. As explained below, the present technology performed by the image condensing engine 190 includes methods for computing multiple centroids. The image condensing engine 190 may be performed by the graphics processing unit 108/229. However, those of skill in the art will appreciate that the operation of the image condensing engine 190 may be carried out by other processing components in the computing environment 12 and/or capture device 20 in addition to or instead of the graphics processing unit 108/229.

As used herein, a centroid is a localized cluster of non-zero probability that a body part is correctly identified. As explained below, the centroids are iteratively processed to result in exemplary "centers" of the clusters. In addition to position information, a cluster has a shape, surface area size and mass (the probability scores of its constituent pixels). The cluster may be analyzed to determine the likelihood that the shape, surface area size and mass of a cluster corresponds to a given body part.

The image condensing engine 190 performs a method which, through a hierarchical merging and sorting process, is suitable for highly parallel execution (e.g., on graphics processing unit 108/229). However, processing may be performed serially in further embodiments. The method coalesces the body part distributions from local regions that are continuously increasing in size into multiple representative centroids. Each centroid includes a three dimensional position defining the center of a coalesced body part distribution in space and a confidence value derived from the aggregated probabilities in the cluster. Merging is based on a gravity model with normalized confidence values used as an embodiment of mass.

As indicated above, after the initial exemplar processing step, the system has a classification map in which pixels are classified with a probability of belonging to a particular body part. The system also has a depth map from the capture device 20. Referring now to the flowchart of FIG. 4, for every pixel in the input classification map and depth map, the two dimensional pixel position and the depth sampled at that location are converted into a three dimensional spatial position in step 400.

A density is then computed in step 404 for the pixel as the surface area of the pixel in space at the identified depth. That is, pixels covering an area farther away from the capture device will have a linearly scaled difference in density in comparison to pixels convering an area closer to the capture device. An absolute confidence value is then calculated in step 408 for each body part defined in the exemplar process. The absolute confidence value for each pixel is the density scaled by the body part probability that is assigned to the pixel by the exemplar process. A pixel whose body part probability is zero will have a zero confidence value and will fail to contribute to any subsequent centroid formation for that part.

In step 409 the three dimensional spatial position, density, and set of absolute body part confidences for each pixel are united to form a set of local centroids. In step 410, the local centroids for each body part are grouped, and each centroid in a group is evaluated against the other centroids in the group in step 414. In embodiments, the centroids may be formed into 2×2 aligned groups of centroids from the input, though they may be larger than that in further embodiments. The two centroids derived from the first pixel row are evaluated against one another and the two centroids derived from the second pixel row are evaluated against one another. The centroids in respective columns may alternatively be evaluated against each other in the first pass.

Figure 5:
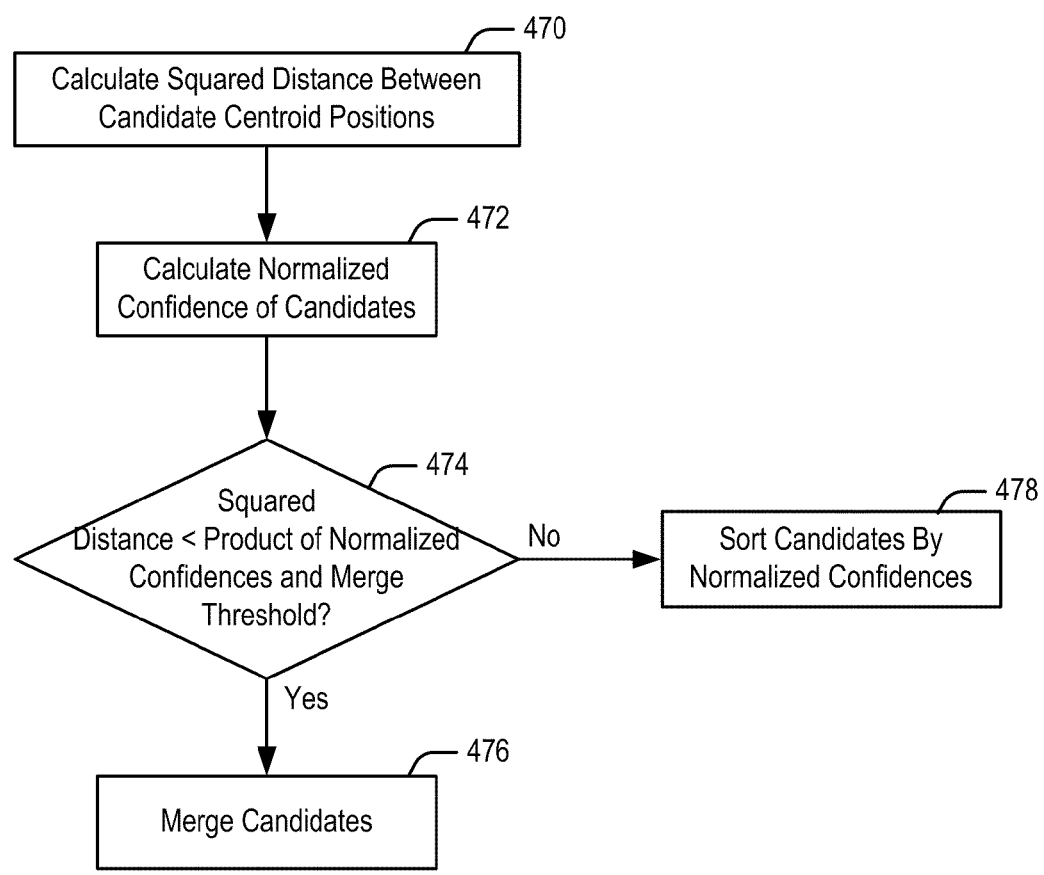
FIG. 5 is a flowchart with more detail of step 414 of FIG. 4.

Further details relating to evaluation step 414 are explained now with reference to the flowchart of FIG. 5. In step 470, the squared distance between the spatial positions of two candidate centroids (also referred to herein as just "candidates") is calculated. In step 472, the normalized confidence of the candidate centroids is calculated (step 472 is explained in greater detail below with respect to the flowchart of FIG. 6). In step 474, if the calculated squared distance is less than the normalized confidence of the first candidate multiplied by the normalized confidence of the second candidate multiplied by a constant "merge threshold" value, the two candidates are merged together through a process of interpolation in step 476. The merge threshold may be analogous to a gravitational constant setting when centroids will merge so that the merging is not too sensitive or too resistant. It is contemplated that the merge threshold may be set to differing values for each body part or may be omitted entirely in alternative embodiments. Step 476 is explained in greater detail below with respect to the flowchart of FIG. 7, but in general, two centroids will merge if they are close enough in space relative to their probabilities of being correctly classified. If not, the candidates are sorted by their normalized confidences (with the candidate of greater confidence placed first).

Figure 6:
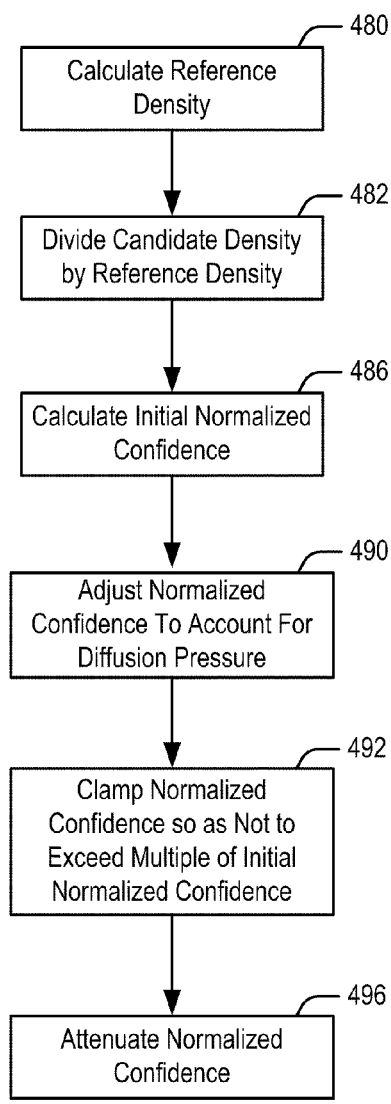
FIG. 6 is a flowchart with more detail of step 472 of FIG. 5.
Figure 7:
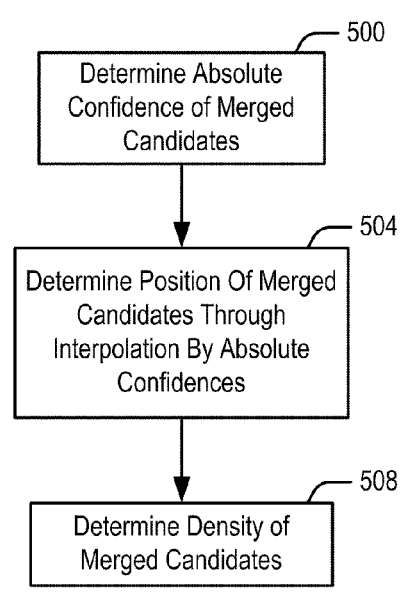
FIG. 7 is a flowchart with more detail of step 476 of FIG. 5.

FIG. 6 provides further details of how the confidence of each candidate is normalized and calculated. In general, the candidates are first normalized so that they may be compared to each other. In step 480, the reference density of the candidate is obtained by calculating the spatial surface area of the candidate assuming it was formed from a single pixel appearing at the candidate depth in the field of view (FOV). The density of the candidate is divided by this reference density in step 482 to obtain a density ratio (approximating the number of samples that have contributed to forming the candidate). Alternative embodiments may instead maintain the actual number of contributing samples, exchanging additional storage and bandwidth for processing work. In step 486, a normalized confidence is initially calculated to be the absolute confidence assigned to the candidate (step 408) divided by the candidate density.

The normalized confidence is then adjusted in step 490 to counteract exemplar probability diffusion pressure by multiplying it by the sum of one plus the product of the density ratio and a diffusion scale constant:

diffusion_normalized_confidence=(candidate_absolute_confidence/candidate density)×(1+(density_ratio×diffusion_scale)).

The normalized confidence is further clamped in step 492 such that it cannot exceed a multiple of its initial normalized confidence:

diffusion_normalized_confidence=min(diffusion_normalizedconfidence, candidate_absolute_confidence×(candidate_density×diffusion_scale_limit)).

The diffusion normalized confidence is next attenuated in a progressive fashion through multiplication by an attenuation factor in step 496. The purpose of step 496 is to attenuate the probability of a single centroid as other centroids are iteratively merged. For example, if a centroid cluster has been formed from a lot of source pixels in successive centroid merges, and there is another centroid formed from a single pixel which hasn't merged, they may have comparable probability and may be relatively near to each other in space. If the two centroids (comprising the large cluster and the single pixel) simply merged, the latter single-pixel centroid would have undue influence on the composition of the resulting centroid. Accordingly, the present technology attenuates the probability of centroids formed of individual pixels or small groups of pixels in comparison to centroids formed of relative larger pixel samples. An alternative embodiment could accomplish a similar outcome through a progressive amplification of centroid confidences as they engulf a greater number of classified samples.

The attenuation factor is calculated by dividing the density ratio by the result of two to the power of the hierarchical level at which the candidate is being evaluated. Both the level of evaluation and the attenuation factor are further "clamped," so as not to exceed a level_attenuation_limit constant and 1.0, respectively. So the final attenuated_confidence is given by:

final attenuated_confidence=diffusion_normalized_confidence×min(1.0,density_ratio/($2^{\text{min(level, level\_attenuation\_limit)}}$))).

If the density of a candidate is equal to zero, the final attenuated confidence will likewise be set to zero.

As indicated above with respect to step 474, FIG. 5, if the calculated squared distance between the candidates is less that the normalized confidence of the first candidate multiplied by the normalized confidence of the second candidate multiplied by a constant merge threshold value, the two candidates are merged together through a process of interpolation in step 476. Further details of the merge step 476 are now explained with reference to the flowchart of FIG. 7. The absolute confidence of two merged candidates is determined in step 500 as a sum of absolute confidences:

merge_absolute_confidence=candidate0_absolute_confidence+candidate1_absolute_confidence.

The position of two merged candidates is determined in step 504 by interpolation of absolute confidence such that merge_position is given by:

merge_position=(candidate0_position×candidate0_absolute_confidence+candidate1_position×candidate1_absolute_confidence)/merge_absolute_confidence.

Next, the density of two merged candidates is determined in step 508 as the sum of the candidate densities: merge_density=candidate0_density+candidate1_density.

After the first row and second row of centroids in a single group have been merged or sorted, there will be two, three or four resulting centroids. In particular, if the centroids from both rows merged as described above, there will be two centroids. If the centroids from only one of the two rows merged, there will be three centroids. And if none of the centroids merged, there will be four centroids (identical to the four candidate centroids in value).

Figure 4:
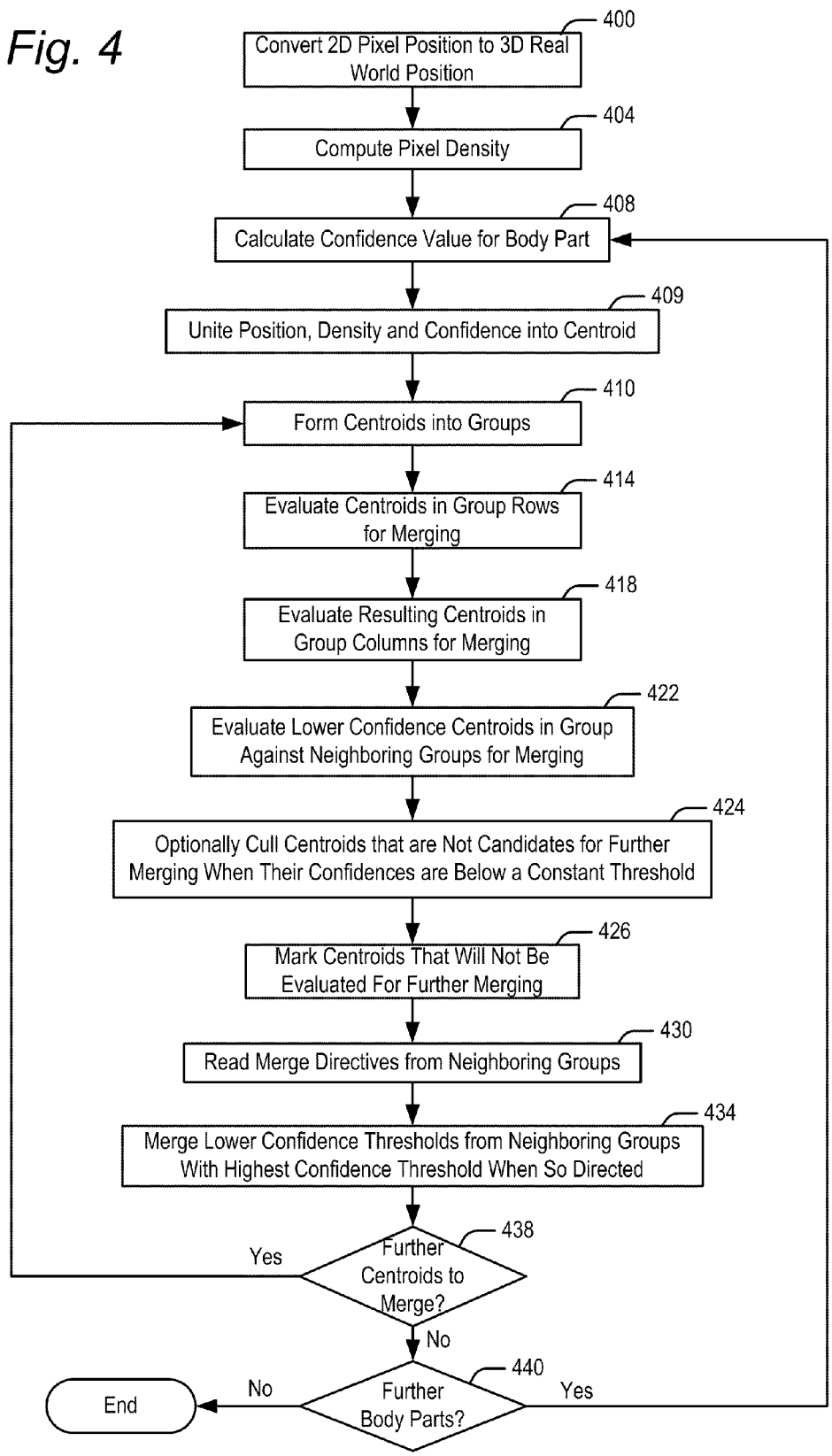
FIG. 4 is a flowchart for condensing an image according to embodiments of the present technology.

Referring again to the flowchart of FIG. 4, the resulting centroids from the two rows are similarly evaluated against each other in step 418 for merging and sorting. The steps of FIGS. 5-7 are again performed. The centroids with the greatest confidence will first be evaluated against one another for merging/sorting. If they successfully merge, then the centroids with the least confidence will be evaluated against one another for merging. If they fail to merge, the centroid with the second greatest confidence will be evaluated against the centroid with the third greatest confidence (if any). This process continues, in an attempt to evaluate all candidate centroids agaist one another, and will produce from one to four resulting centroids, sorted by their normalized confidences in a descending order. The centroid with the greatest normalized confidence will go on to be the representative centroid from the local region in a subsequent hierarchical pass that evaluates the local region against neighboring regions for further centroid merging. Any centroids of lesser confidence, should they fail to be combined with the representative centroids of neighboring regions (in a step to be described below), will remain as independent local clusters in the final set of body part proposals. Alternate embodiments may support multiple representative centroids from local regions in subsequent hierarchical passes, in which case one or more centroids of lesser confidence could also be propagated.

As one example, assume the two centroids in a top row of storage merged, but a centroid in the bottom row was not strong enough to merge together with the other centroid in the bottom row. When the two rows were then evaluated against one another, the top row centroid may have merged with the stronger of the two at the bottom row and create a single new centroid. The one that will win out and go on to be processed as the representative centroid for that 2×2 group will be the strongest (highest confidence value) of either of the centroid formed from the two top row samples combined with the bottom row sample, or the remaining unmerged centroid candidate from the bottom row. Alternatively, if the top row centroid does not merge with either of the two from the bottom row, the result is one centroid from the top row and two other centroids from the bottom row (because they did not merge). The one that will win in this case will be centroid with the strongest confidence of either of the two candidates from the bottom row or the new centroid that was formed from the top row.

Given the nature of the spatial subdivision inherent in pixel-based input and centroid storage, it would be limiting to restrict the evaluation of centroid candidates to only that of a 2×2 group. Just because a centroid candidate may fail to merge with its neighbors in the aligned subdivision does not mean that it could not merge with other immediate neighbors. For example, the position of a centroid stored in the bottom right of a 2×2 group may be located far from the other three centroids in the group, yet very near in space to a centroid stored in the bottom left of a 2×2 group neighboring on the right. In such a case, the centroid, after failing to merge with any other candidates in its group and having a relatively lower confidence in the merge results, would benefit from further evaluation against its neighboring groups. Accordingly, the output from step 422 is processed in another pass, where the zero to three resulting centroids from each merged/sorted pixel group, excluding the centroid with maximum confidence, are evaluated for merging against centroids with maximum confidence from neighboring groups. The neighboring groups may include the group above, below, to the left and/or to the right. The groups checked may be some subset of these groups in further embodiments, or be some expansion to include neighboring diagonal groups to the upper-left, upper-right, lower-left, and lower-right. Further embodiments may also extend the candidate centroids in neighboring groups to include not just those of maximum confidence, but all resulting centroids (with corresponding rules to restrict the directions in which centroids may merge across groups).

If, in the check of step 422, two centroids' square distances relative to their normalized confidences and merge threshold are small enough, the candidate centroid from the group will be directed to merge with the neighbor (performed in a subsequent pass to achieve full parallelism). Again excluding the centroid with highest confidence in the group from consideration, the remaining centroids that are not directed to merge with neighbors may optionally be culled in step 424 if their normalized confidence (calculated using the value of the final hierarchical level) fails to exceed a threshold. This step may be performed to reduce centroid search time during subsequent extraction by removing centroids of low confidence. Step 424 may be omitted in further embodiments. Surviving centroids are identified in step 426 through residence information (e.g., a bit per centroid storage used to indicate whether a valid centroid exists at the location).

In step 430, the merge directives from each of the pixel groups above, below, to the left, and to the right of each group are read. The system then selects the appropriate lower-confidence centroids from the neighboring groups. It merges these centroids (through the interpolation process) with the centroid of highest confidence in the given group in step 434. Again, this process may be performed on all groups using parallel processing.

The above process of steps 410 to 434 are repeated in a hierarchical fashion until, in step 438, there are no further centroids to merge or sort. The centroids with the highest normalized confidence from each 2×2 group are collected together into a storage set which is half the resolution of the original in each dimension. This set is itself divided into 2×2 groups and the process is repeated from steps 410 to 434 until the set can no longer be subdivided either horizontally or vertically, ultimately producing a pyramid of centroids sorted regionally by normalized confidence and forming a quad tree in structure. Since a square input image is not a requirement, when a set gets down to N×1 or 1×N in dimension (or the dimension N itself is not a multiple of two), the set may be padded to N×2 or 2×N with the padded storage locations initialized with centroids of zero density, confidence, position, and residence. As the quad tree pyramid is constructed, the residence information is additionally prepared to include a bit for each node group that tracks the presence of valid centroids in any of the descendants of a node. The bit provides a useful optimization in extraction, where the sub tree originating at a given node need not be examined for centroids if the bit is not set. The sub tree may additionally be skipped if the centroid of highest confidence at a node is not greater than a centroid already identified during a search.

The above steps are performed iteratively on each identified body part. Accordingly, in step 440, the process checks if there are additional body parts for analysis. If so flow returns to step 408 and performs steps 408 through 438 on the next body part. The process ends when all body parts have been considered.

Given the above disclosure, those of skill in the art will appreciate other steps which may be added or substituted for one or more of the above-described steps. In one such example, mean shift clustering may be used with the present technique for clustering pixels into the above-described centroids. Further details of the mean shift clustering algorithm are set forth for example in a publication by D. Comaniciu and P. Meer, entitled, "Mean Shift: A Robust Approach Toward Feature Space Analysis," IEEE Trans. Pattern Anal. Machine Intell., 24:603-619, 2002, which publication is incorporated by reference herein in its entirety.

Figure 8:
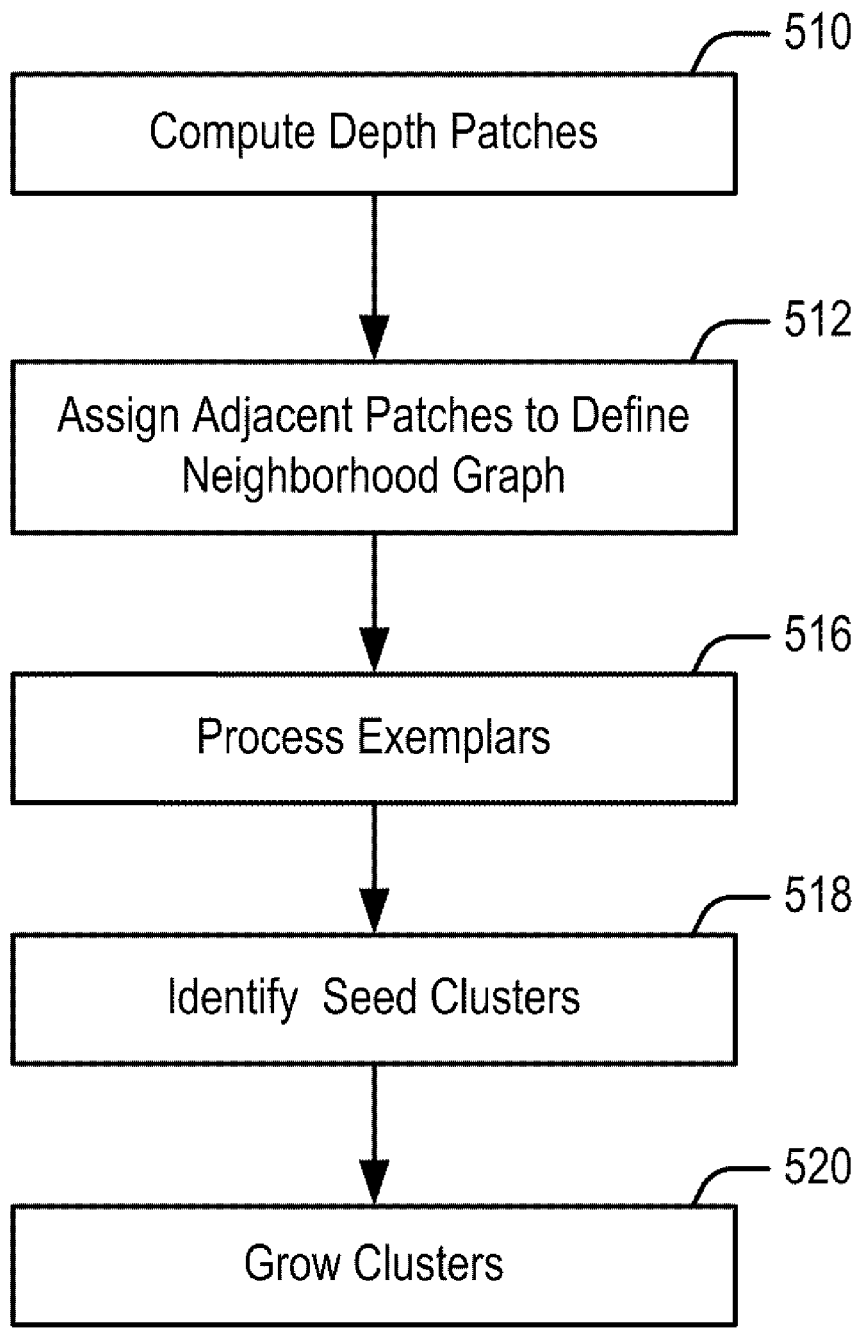
FIG. 8 is a flowchart for condensing an image according to alternative embodiments of the present technology.

FIG. 8 shows a further embodiment of the present technology for generating centroids that, by preprocessing the depth array to a low-dimensional representation, may be used by systems with low memory bandwidth. However, it is understood that the embodiment of FIG. 8 may be used in any instance in which the embodiment of FIG. 4 described above may be used.

The embodiment of FIG. 8 includes a preprocessing step which takes place once for each new depth map. The remaining stages are repeated for each body part. The preprocessing step includes a step 510 of computing depth patches. In particular, the depth image is segmented into regions of approximately constant depth. Each of these regions is then approximated by a frontoparallel planar patch. Most subsequent processing is in terms of these patches. As there are frequently one or two orders of magnitude fewer patches than there are pixels, this approximation affords a significant reduction in the memory (bandwidth) requirements for this method.

A neighborhood graph is defined in step 512, by assigning to each patch the list of patches adjacent to it (i.e., those with which it shares a boundary). The exemplar is processed in step 516. For each patch, the average probability assigned by the exemplar process to pixels in the patch is computed. This is referred to as the value patch's score. In step 518, the system identifies seed clusters. In this step, the set of all patches are computed which are local graph maxima; that is, the set of patches that have a higher score than all of their neighbors. This set is then pruned to include only seed patches with scores greater than a given threshold. Clusters are then "grown" in step 520. Larger clusters are formed using the neighborhood graph by growing outward from the seed patches. Further details regarding the growing of seed clusters are described below with reference to the flowchart of FIG. 9.

Figure 9:
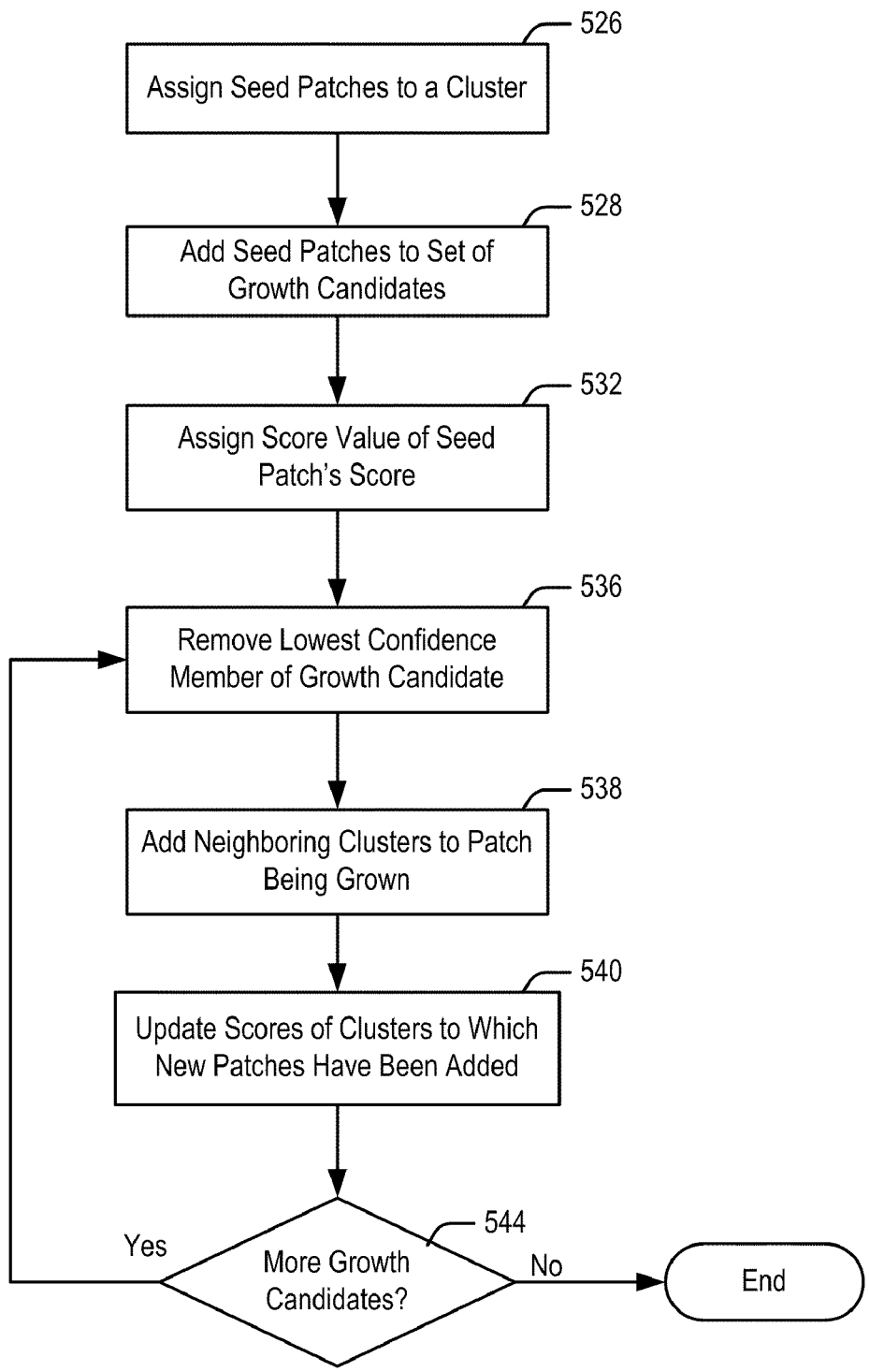
FIG. 9 is a flowchart with more details of step 520 of FIG. 8.

As shown in FIG. 9, the growing of seed clusters begins with initialization of the seed patches. Each seed patch is assigned to a unique cluster in step 526, and each seed patch is added to a set of growth candidates in step 528. In step 532, each cluster is assigned a score value equal to its seed patch's score.

In step 536, a member of the growth candidate set having the lowest confidence is removed. In step 538, neighboring clusters may be added to the cluster of the patch being grown. In determining whether to add neighboring clusters, the following three rules may be applied. Rule 1: if the neighbor is not assigned to any cluster, assign it to the cluster of the patch being grown. Rule 2: if the neighbor is assigned to a different cluster, apply the "growth contest rule." The growth contest rule states that when two clusters compete for a patch, the patch is assigned according to which cluster is more favorable. One option for this is to assign the contested patch to the cluster with greatest confidence thus far. Rule 3: unless the "stopping condition" is met, add the visited neighbor to the growth candidate set. The stopping condition is met when the total area dedicated to the cluster to which it is assigned exceeds some predefined maximum value.

In step 540, the scores of clusters to which new patches have been added may be updated. Options for this update include, but are not limited to, incrementing the cluster score by the score of the added patch, or some variant of the merging rule used for the graphics processing unit implementation discussed above.

In step 544, the system checks whether the growth candidate set is empty. If not, the system repeats steps 536-540. When the growth candidate set is empty, the algorithm ends. For each cluster that has been assigned one or more patches, a centroid is computed with a position given by the mean position of the cluster's constituent patches, and confidence equal to the cluster's final score.

While the present technology has been described above in the context of condensing centroids from the classification of depth images, a variant of exemplar processing could be constructed to operate on color or any other arbitrary probability distribution. The present technology includes the possibility of condensing centroids from any type of probability distribution cloud in either two or three dimensions (the operation for 2D is very similar, but with two dimensional positions and uniform initial densities).

Furthermore, exemplar classification and/or centroid condensation could alternatively be applied to synthetic images. For example, the above-described condensation process may be applied to find centroids on computer generated 'ground truth,' where skeletal poses are rendered using synthetic human models containing texture-mapped harlequin coloration for various body parts. Here the depth information is computed rather than captured and the classification is known in advance rather than analyzed.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of condensing centroids from a probability distribution cloud representing a plurality of parts of an object, comprising:
    a) exemplar processing of a data sample set to assign a plurality of probabilities to each of the samples of said set, each assigned probability relating to the probability that one of said samples belongs to a respective one of said parts of the object;
    b) combining the samples' positions with the assigned probabilities to produce a probability distribution cloud;
    c) clustering one or more subgroups of the samples together to form one or more candidate centroids for the parts of the object, the clustering of one or more subgroups in said step c) depending on a proximity between the samples and the assigned probabilities.

2. The method of claim 1, further comprising the step of assigning a confidence value to the one or more candidate centroids, the confidence value for a centroid indicating the likelihood that the centroid corresponds to a correct part of the object.

3. The method of claim 2, said step of assigning a confidence value to the one or more candidate centroids comprising the step of assigning a confidence value based on a size and shape of a subgroup and the probabilities of its constituent samples.

4. The method of claim 1, said step c) of clustering one or more subgroups of the samples together to form one or more candidate centroids comprising the step of merging a pair of samples in a subgroup if they are close enough in space relative to their probabilities of being correctly classified.

5. The method of claim 1, said step c) of clustering one or more subgroups of the samples together to form one or more candidate centroids comprising the steps of:
    d) squaring a distance between spatial positions of two candidate samples;
    e) determining a normalized confidence of the two candidate samples; and
    f) merging the two samples if the distance calculated in said step d) is less than the normalized confidence of the first candidate determined in said step e) multiplied by the normalized confidence of the second candidate determined in said step e) multiplied by a constant merge threshold value.

6. The method of claim 5, further comprising the step g) of sorting the two candidate samples by their respective normalized confidences if the two candidate samples are not merged in said step f).

7. The method of claim 6, said steps d) through g) comprising a step h) of performing steps d) through g) on pairs of adjacent samples in a subgroup of samples.

8. The method of claim 7, further comprising the steps of repeating said steps d) through g) on merged and/or sorted samples remaining after said step h).

9. The method of claim 5, further comprising the step of attenuating or amplifying the confidence of a sample based on the number of samples merged to form the sample and the size of the spatial region the sample represents in comparison to other samples which have been merged per step f).

10. In a system comprising a computing environment coupled to a capture device for capturing depth images of a body, a method of identifying real world objects, comprising:
    a) determining depth information for a group of pixels captured by the capture device;
    b) receiving exemplar classification results assigning a plurality of probabilities to said group of captured pixels, wherein each of said probabilities indicates that a group of captured pixels belongs to a respective one of said real world objects;

c) assigning each of a plurality of confidence scores to each of a plurality of candidates, the candidates being pixels in the group of captured pixels or centroids formed from pixels in the group of captured pixels, the confidence scores based in part on the exemplar classification in said step b); and d) iteratively evaluating arrays of the candidates for merging together to form a next candidate set based on the candidates' proximity to each other in space and their confidence scores determined in said step c).

11. The method of claim 10, said step c) comprising the step of assigning a confidence value based on a size and shape of the group of pixels and the probabilities of its constituent pixels assigned in said step b).

12. The method of claim 10, further comprising the step f) of normalizing the confidence scores assigned in said step c).

13. The method of claim 10, said step d) comprising the step of iteratively evaluating two by two arrays of candidates.

14. The method of claim 10, said step d) comprising the steps of:

g) squaring a distance between spatial positions of two of said candidates;

h) determining a normalized confidence of the two candidates; and j) merging the two candidates if the distance calculated in said step g) is less that the normalized confidence of the first of the two candidates determined in said step h) multiplied by the normalized confidence of the second of the two candidates determined in said step h) multiplied by a constant merge threshold value.

15. The method of claim 14, further comprising the step k) of sorting the two candidates by their respective normalized confidences if the two candidates are not merged in said step j).

16. The method of claim 10, said step d) comprising the step of iteratively evaluating a plurality of said arrays by parallel processing.

17. The method of claim 10, further comprising the step of repeating the iterative process of said step d) to produce a pyramid of centroids sorted regionally by normalized confidence and forming a quad tree in structure.

18. In a system comprising a computing environment coupled to a capture device for capturing depth images of a body, a method of identifying real world objects, comprising:

a) determining a plurality of depth patches by segmenting the depth image into regions of approximately constant depth;

b) assigning to each patch a list of the patches adjacent to said each patch to define a neighborhood graph;

c) processing exemplars by computing an average probability score assigned by an exemplar process to pixels in each of said patches;

d) identifying seed clusters as the set of said patches that have a higher score than all of their neighbors; and e) growing clusters outward from the seed clusters.

19. The method of claim 18, said step e) comprising the steps of:

i) adding a neighbor cluster to a current seed cluster being grown if the neighbor is not assigned to any cluster;

ii) adding a neighbor cluster to a current seed cluster being grown if the neighbor is assigned to another cluster, but the current seed cluster has a higher confidence value, where the confidence value is based at least in part on the exemplars processed in said step c); and iii) adding a neighbor cluster to a current seed cluster being grown if the total area dedicated to the current seed cluster does not exceed a predefined maximum value.

20. The method of claim 19, further comprising the step of updating the average probability scores after a neighbor has been added to the current seed cluster.

* * * * *